United States Patent
Tsuji

(10) Patent No.: US 7,822,179 B2
(45) Date of Patent: Oct. 26, 2010

(54) APPARATUS AND METHOD FOR PROCESSING RADIATION IMAGE

(75) Inventor: Tetsuya Tsuji, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 118 days.

(21) Appl. No.: 12/207,895

(22) Filed: Sep. 10, 2008

(65) Prior Publication Data

US 2009/0080754 A1   Mar. 26, 2009

(30) Foreign Application Priority Data

Sep. 21, 2007   (JP)   ............... 2007-245348

(51) Int. Cl.
*H05G 1/64*   (2006.01)
(52) U.S. Cl. .................. 378/98.8; 378/98.11
(58) Field of Classification Search ........... 378/98.8, 378/91, 98.11, 62
See application file for complete search history.

(56) References Cited

U.S. PATENT DOCUMENTS

2004/0008817 A1 * 1/2004 Nagai .................. 378/98.5

FOREIGN PATENT DOCUMENTS

JP   2000-75039 A   3/2000
JP   2003-319264 A   11/2003

* cited by examiner

*Primary Examiner*—Hoon Song
(74) *Attorney, Agent, or Firm*—Sughrue Mion, PLLC

(57) ABSTRACT

The invention relates to an apparatus and method for processing a radiation image. For a subject area, a radiation image signal corrected for leak charge is obtained by subtracting, from a GateOn signal obtained by turning on a transistor switch of a detecting element of a radiation detector, a GateOff signal obtained by turning off the transistor switch. A threshold value is less than or equal to a pixel saturation value. For an unblocked area where the radiation image signal is greater than the threshold value, the GateOn signal is utilized as the radiation image signal.

9 Claims, 9 Drawing Sheets

APPARATUS AND METHOD FOR PROCESSING RADIATION IMAGE

BACKGROUND OF THE INVENTION

1. Field of the Invention

The present invention relates to a radiation image processing apparatus and processing method thereof that capture a radiation image by detecting and processing radiation with a radiation detector.

2. Description of the Related Art

In the medical field, for example, a radiation image processing apparatus is extensively used, which exposes a subject (patient) to radiation emitted from a radiation source, detects and processes the radiation that has passed through the subject with a radiation detector to obtain radiation image information. The obtained radiation image information is then displayed on a display unit for diagnostic use or the like.

FIG. 7 schematically illustrates the configuration of a typical radiation detector 2. The radiation detector 2 includes a plurality of detecting elements 11-55 arranged in a matrix form.

The detecting elements 11-55 are connected to gate lines 4a-4e extending from a gate driving circuit 3, and also to signal lines 6a-6e extending from a signal reading circuit 5. A reading control circuit 7 provides control signals to the gate driving circuit 3 and the signal reading circuit 5, to select one of the gate lines 4a-4e and one of the signal lines 6a-6e, respectively. Thus, the charge information of the specified one of the detecting elements 11-55 can be read out.

FIG. 8 illustrates an equivalent circuit of one of the detecting elements 11-55. Each of the detecting elements 11-55 includes a common electrode 8 supplied with a bias voltage from a power source B, a converting layer 9 such as an amorphous selenium (a-Se) layer given by vapor deposition, for converting radiation X to a charge signal, a pixel electrode 10 for collecting the charge generated by the converting layer 9, a storage capacitor C for holding the collected charge, and a transistor switch Tr for providing the charge information held in the storage capacitor C to an external circuit. The source, gate, and drain terminals of the transistor switch Tr are connected to the storage capacitor C, one of the gate lines 4a-4e, and one of the signal lines 6a-6e, respectively.

Exposure of the radiation detector 2 to excessive radiation X with the transistor switch Tr in OFF state causes a large amount of charge to be stored into the storage capacitor C, resulting in an excessive increase of the drain-source voltage, which may damage the transistor switch Tr.

To protect the transistor switch Tr from the damage due to high voltages, the prior art disclosed in Japanese Laid-Open Patent Publication 2000-075039 has the power source B apply a negative bias voltage to the common electrode 8 so that the polarity of the common electrode 8 is set to be the same as that of the gate terminal of the transistor switch Tr in the OFF state. In this case, application of radiation X causes the potential Vs of the storage capacitor C to drop toward a negative potential. When the potential Vs drops below the negative potential Vg of the gate, the transistor switch Tr is forced to turn on, allowing discharge of the storage capacitor C and thereby preventing damage to the transistor switch Tr.

In the radiation detector 2 of the above configuration, exposure of the radiation detector 2 to excessive radiation X forces the transistor switch Tr to turn on, allowing the detecting elements 11-55 to release charge, which will be referred to hereinafter as leak charge. Therefore, if the period between completing irradiation with the radiation X and starting to read out the charge information from each detecting element 11-55 with the signal reading circuit 5 is short, acquired radiation images 60 may include inappropriate artifacts 62a and 62b generated by the leak charge, as shown in FIG. 9.

If the charge information is read out from the detecting elements 11-55 in sequence from the gate line 4a to gate line 4e, that is, in the direction indicated by the arrow shown in FIG. 9, the charge information read out from the detecting elements 11-15 additionally includes the leak charge of the detecting elements 11-55 and thus is greatly affected by the leak charge. The charge information read out from the detecting elements 51-55 of the gate line 4e, on the other hand, is less affected by the leak charge since the leak charge of the detecting elements 11-45 have already been read out.

The contrast of the radiation image 60 is typically controlled so that a suitable brightness is obtained at the center of the subject image 64 (which is the image of a head in FIG. 9). In the case shown in FIG. 9, the radiation image has a lower portion of a central section of the subject image 64 (the area between the dashed-dotted lines 66a and 66b), where the neck is located. If, however, the contrast of the center of the radiation image 60 is controlled so that the neck portion of the subject image 64 is unaffected by the leak charge from the detecting elements 11-55 corresponding to the neck portion, artifacts 62a and 62b are generated on the subject image 64 due to the leak charge of the detecting elements 11-55 located outside the dashed-dotted lines 66a and 66b.

SUMMARY OF THE INVENTION

It is a general object of the present invention to provide an apparatus and method for processing radiation image that prevent the effect of the leak charge of the radiation detector, and thereby allow production of a suitable radiation image having no artifacts.

It is a major object of the present invention to provide an apparatus and method for processing radiation images that can produce a suitable radiation image even when the radiation detector is exposed to excessive radiation.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
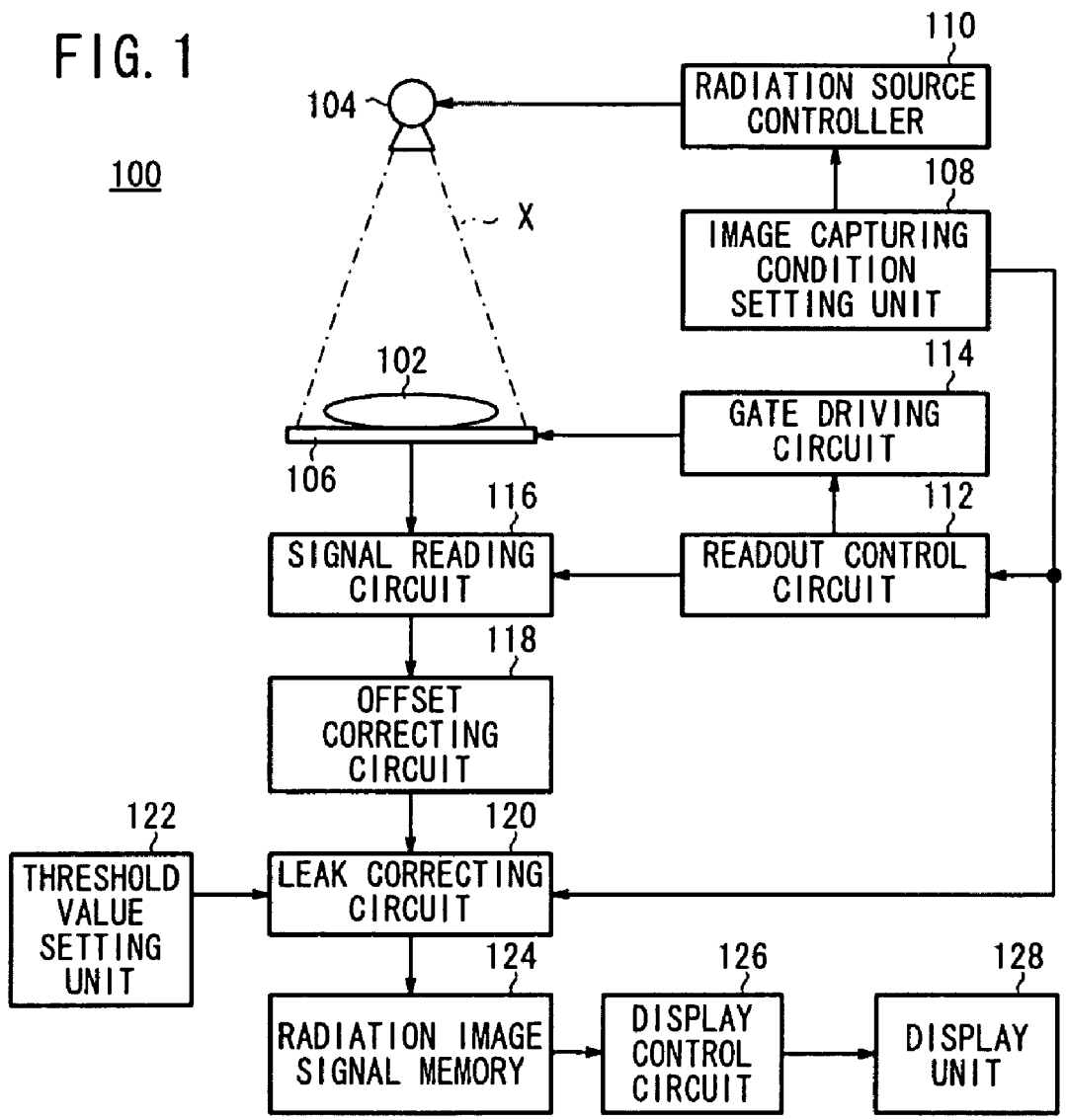
FIG. 1 is a block diagram of a radiation image processing apparatus according to an embodiment of the invention.

FIG. 1 is a block diagram illustrating the configuration of a radiation image processing apparatus 100 according to an embodiment of the invention.

The radiation image processing apparatus 100 includes a radiation source 104 for applying radiation X to a subject 102, and a radiation detector 106 for receiving the radiation X that has passed through the subject 102 and detecting radiation image information of the subject 102 in the form of charge information. The radiation detector 106 includes a plurality of detecting elements 11-55 of the same structure as those of the radiation detector 2 shown in FIGS. 7 and 8. Thus, the numbers used in FIGS. 7 and 8 will be employed in the following description to indicate the same components.

The radiation source 104 is controlled with a radiation source controller 110 in accordance with the image capturing conditions entered to the image capturing condition setting unit 108. The image capturing conditions include conditions for the radiation source 104 set in accordance with the site of the subject to be imaged, such as a tube voltage, a tube current, irradiation time, radiation dose with these conditions, the period between applying radiation X and reading out charge information from the radiation detector 106, and the like.

The radiation detector 106 is connected to a gate driving circuit 114 and a signal reading circuit 116 through a readout control circuit 112. The gate driving circuit 114 selects one of the gate lines 4a-4e in accordance with a control signal provided from the readout control circuit 112. Note that the gate lines 4a-4e extend along respective rows of the detecting elements 11-55 making up the radiation detector 106 and connect to those detecting elements 11-55. The signal reading circuit 116 selects one of the signal lines 6a-6e in accordance with a control signal provided from the readout control circuit 112. The signal lines 6a-6e extend along respective columns of the detecting elements 11-55 and connect thereto.

The signal reading circuit 116 is connected to an offset correcting circuit 118. The offset correcting circuit 118 corrects the charge information read out from each detecting element 11-55 using an offset signal, which represents the charge information generated by each of the same detecting elements 11-55 of the radiation detector 106 when not exposed to radiation X. Note that the offset signal of each detecting element 11-55 is obtained prior to acquisition of images with the radiation image processing apparatus 100.

The offset correcting circuit 118 is connected to a leak correcting circuit 120 that corrects the charge information obtained from each detecting element 11-55 (ON control charge information) using a leak charge signal (OFF control charge information). The leak correcting circuit 120 is provided with image capturing conditions from the image capturing condition setting unit 108 and a predetermined threshold value entered to a threshold value setting unit 122. The leak correcting circuit 120 performs correction processing using a leak charge signal on the charge signal read out from each detecting element 11-55 in accordance with the image capturing conditions and the threshold value.

The leak correcting circuit 120 is connected to a radiation image signal memory 124 for storing the corrected charge signal as a radiation image signal. The radiation image signal memory 124 is further connected to a display unit 128 controlled by a display control circuit 126 to display the radiation image.

The operation of the radiation image processing apparatus 100 configured as above according to the embodiment of the invention will now be described with reference to the flow chart shown in FIG. 2.

First, the image capturing conditions, such as the tube voltage, the tube current, and the irradiation time of the radiation source 104, as well as the period between applying radiation X and reading out the charge signal from the radiation detector 106 or the like are entered to the image capturing condition setting unit 108 (step S1). Then, the threshold value to be used by the leak correcting circuit 120 for leak correction is entered through the threshold value setting unit 122 (step S2).

Next, the radiation source controller 110 activates the radiation source 104 in accordance with the image capturing conditions entered to the image capturing condition setting unit 108, and applies the radiation X to the subject 102 to capture an image (step S3). The radiation X that has passed through the subject 102 reaches the detecting elements 11-55 of the radiation detector 106. This causes the converting layer 9 of the detecting elements 11-55, formed using an a-Se layer or the like, to generate positive and negative charge that corresponds to the radiation image information. The positive charge is drawn to the common electrode 8 applied with negative voltage and disappears, while the negative charge is collected by the pixel electrode 10 and stored into the storage capacitor C.

Upon completion of the exposure of the subject 102 to the radiation X in accordance with the image capturing conditions, the readout control circuit 112 selects the gate line 4a through the gate driving circuit 114 (step S4).

The gate driving circuit 114 turns on the transistor switches Tr of the detecting elements 11-15 connected to the selected gate line 4a by applying a gate voltage Vg to the gate terminals of the transistor switches Tr. Meanwhile, the signal reading circuit 116 selects a single detecting element 11-15 from those specified by the gate driving circuit 114 and reads out, through the drain terminal of the transistor switch Tr of the selected single detecting element 11-55, the negative charge stored in the storage capacitor C as a GateOn signal (Step S5). The GateOn signal read out in this manner is corrected by the offset correcting circuit 118 using the offset signal, which is the output of the transistor switch Tr in an ON state (Step S6). Note that the offset signal for the GateOn signal is obtained, prior to the acquisition of images, by detecting the output of the corresponding detecting element 11-55 in the ON state without exposing the radiation detector 106 to radiation X.

Next, it is determined whether or not the image capturing conditions entered to the image capturing condition setting unit 108 causes artifacts to be produced in the radiation image (Step S7). If the dose of radiation X to be applied to the radiation detector 106 can be regarded as being low enough to avoid the leakage of charge through the transistor switch Tr of each of the detecting elements 11-55, or, if the period between completion of the application of radiation X to the radiation detector 106 and the readout of the charge signal can be regarded as being long enough for the leak charge to disappear, the leak correction processing is not carried out, and the GateOn signal corrected using the offset signal in Step S6 is stored into the radiation image signal memory 124 as the radiation image signal (Step S8).

On the other hand, if the image capturing conditions require a large dose of radiation X to be applied to the radiation detector 106 so that the GateOn signal read out in Step S5 may include the effect of the leak charge, the transistor switches Tr of all the detecting elements 11-55 are turned off, and the charge signal is read out from each signal line 6a-6e as the GateOff signal for the selected gate line 4a-4e (Step S9). The GateOff signal is then corrected by the offset correcting circuit 118 using an offset signal, which is the output of the transistor switches Tr in an OFF state (Step S10). Note that the offset signal for the GateOff signal is obtained prior to the image acquisition of the subject by turning off all the detecting elements 11-55 with the radiation detector 106 not exposed to the radiation X.

Then, the leak correcting circuit 120 compares the GateOn signal corrected using the offset signal in Step S6 with the predetermined threshold value entered to the threshold value setting unit 122 (Step S11). If GateOn signal<threshold value, the GateOff signal corrected using the offset signal in Step S10 is applied with a moving average processing, which will be described below, to reduce electrical noise (Step S12). The GateOff signal is then subtracted from the GateOn signal to correct the radiation image signal for the leak charge (Step S13). The resulting radiation image signal is stored into the radiation image signal memory 124 (Step S14). It should be noted that the predetermined threshold value is defined to be less than or equal to the minimum value of the charge saturation levels (pixel saturation value) of the detecting elements 11-55 to avoid excessive correction of leakage, as will be described below.

Figure 3:
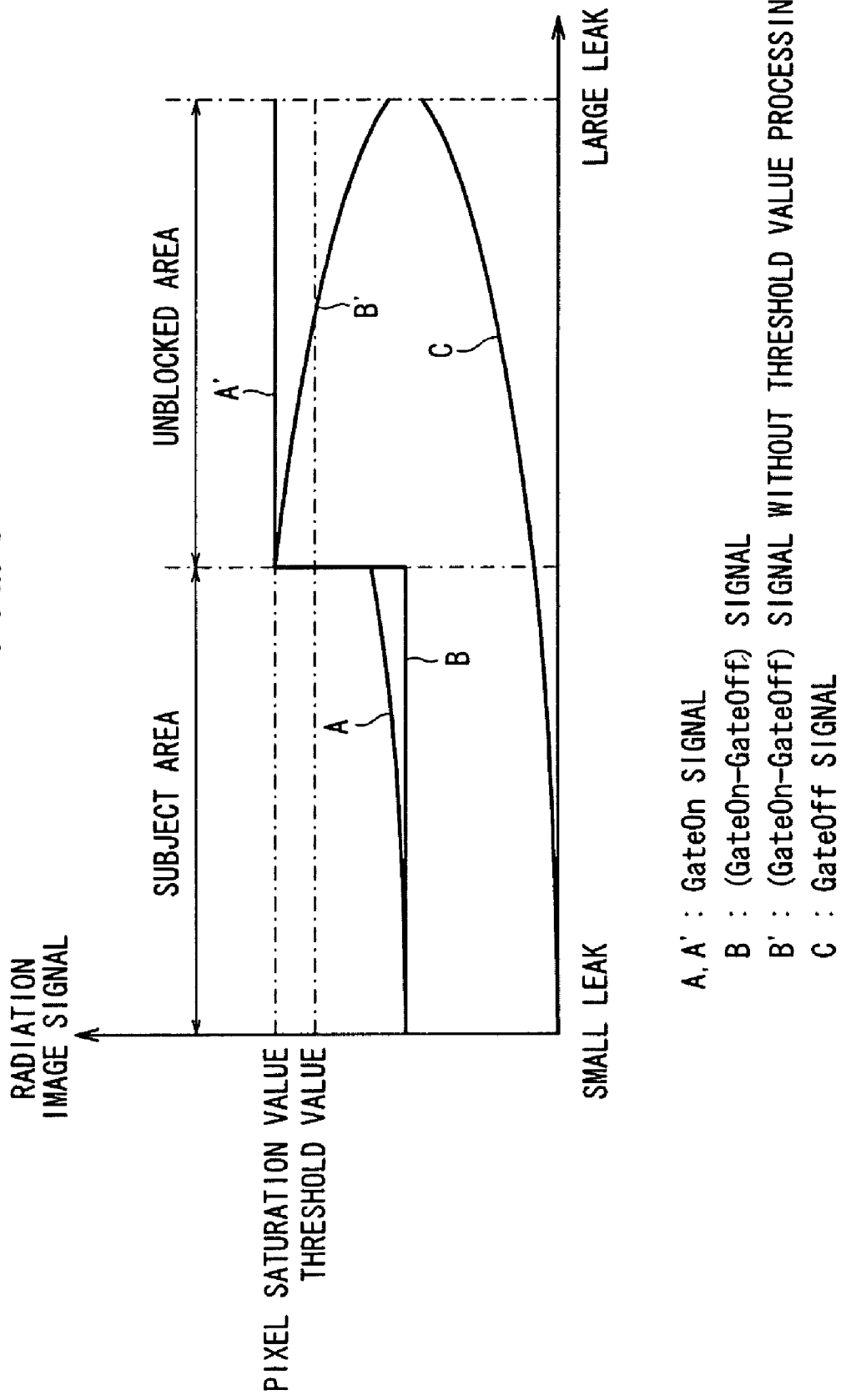
FIG. 3 illustrates radiation image signals generated with leak correction processing not including threshold processing.
Figure 7:
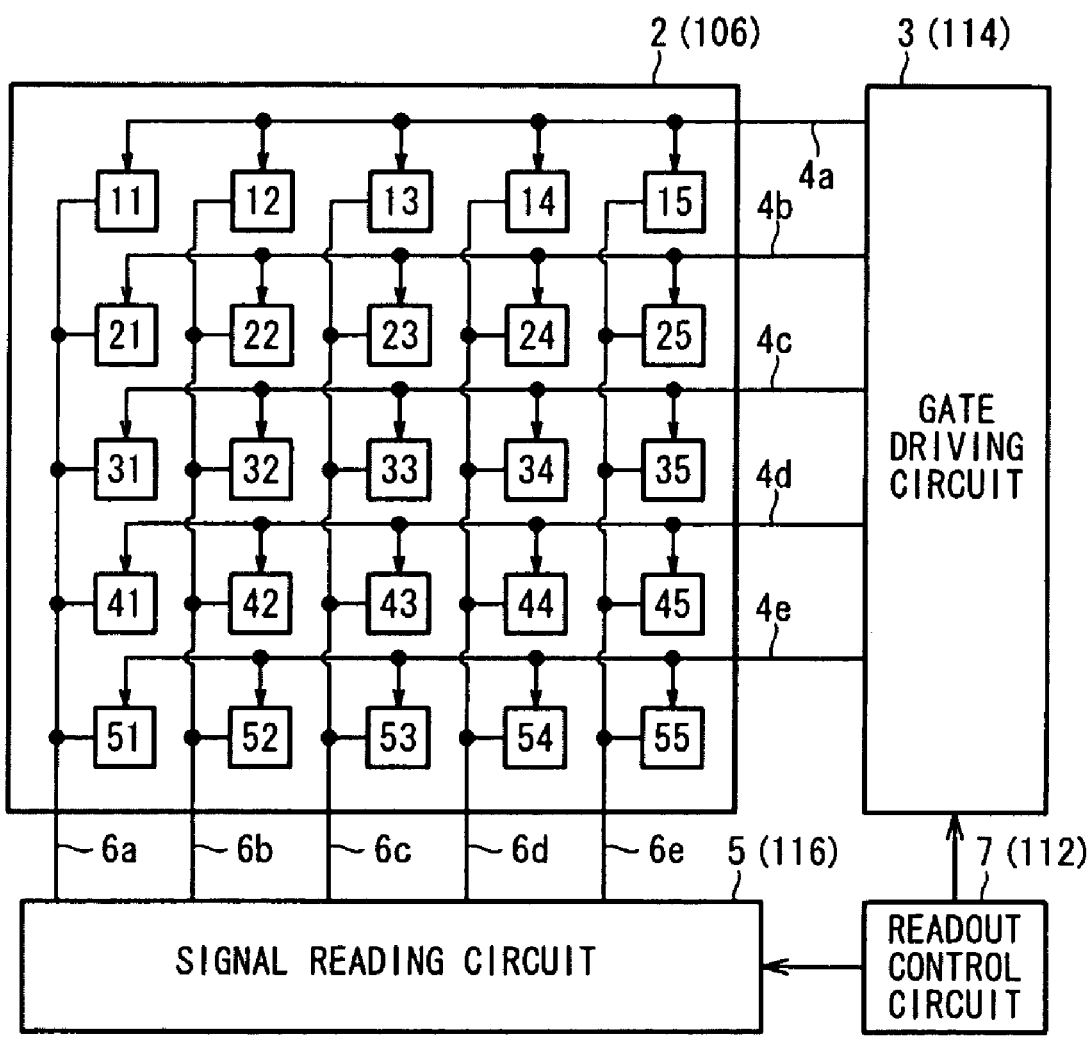
FIG. 7 schematically illustrates the configuration of a radiation detector.
Figure 8:
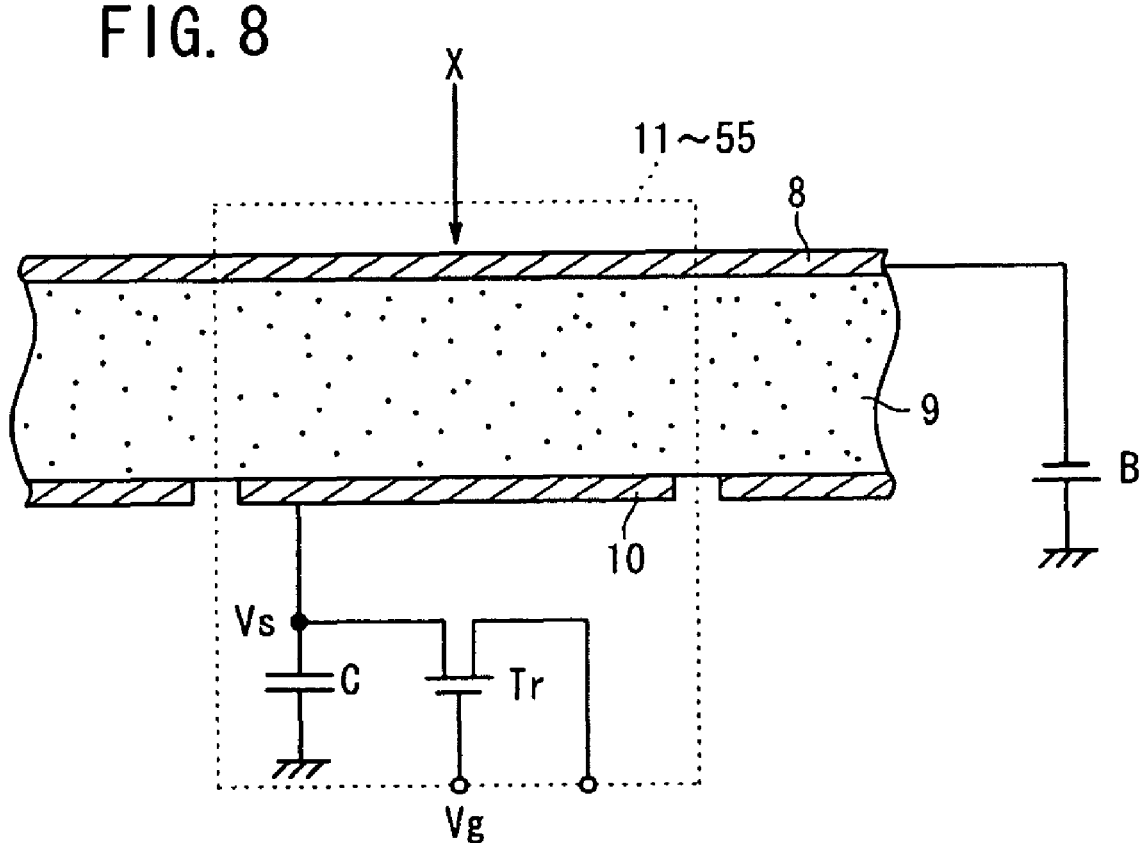
FIG. 8 is an equivalent circuit of a detecting element of the radiation detector shown in FIG. 7.
Figure 9:
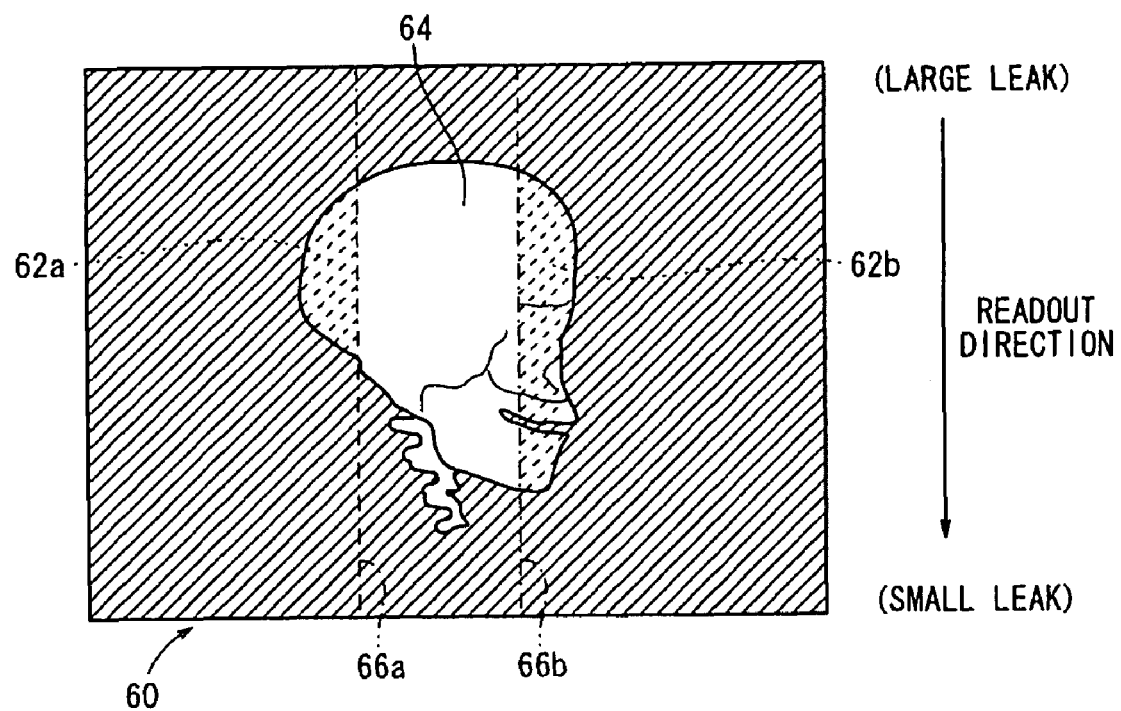
FIG. 9 illustrates a radiation image including artifacts generated when leak correction processing is not performed.

Referring to FIG. 7, the GateOn signal of each detecting element 11-15 selectable using the gate line 4a, for example, includes, in addition to the leak charge of each of the detecting elements 11-15 themselves, the leak charge generated by the other detecting elements, among the detecting elements 21-55, connected to each of the same signal lines 6a-6e. Referring now to FIG. 3, the GateOn signal A obtained from the signal lines 6a-6e corresponding to the central area of the subject image 64 shown in FIG. 9, which area will be referred to hereinafter as the subject area, allows production of a subject image 68 (see FIG. 4) free from artifacts such as those shown in FIG. 9 by subtracting from the GateOn signal A the GateOff signal C, which is the leak charge signal, since the amount of charge stored in each detecting element 11-55 is lower than the pixel saturation value, and since the leak charge signal added to the GateOn signal A is small.

The moving average processing is a smoothing operation for reducing the electrical noise of the GateOff signal. In the present embodiment, the moving average of the charge signal is calculated from the charge signals of the detecting elements belonging to the row and column including one of the detecting elements 11-55 of interest. If a GateOff signal not processed with the moving average is subtracted from the GateOn signal, electrical noise in the resulting radiation image signal will increase by a factor of √2 over the GateOn signal as noise. This electrical noise can be reduced by applying the moving average processing to the GateOff signal. It should be noted that the noise reduction may also be achieved by applying a filtering process instead of the moving average process to the GateOff signal.

The moving average process or the filtering process may be carried out only in the direction of the gate lines 4a-4e, only in the direction perpendicular to the gate lines 4a-4e, or in both of these directions. In the case of both directions, one dimensional smoothing operation may be carried out in sequence for the row and column directions, or a two dimensional smoothing operation may be employed for simultaneous processing in two directions. The smoothing operation in the direction perpendicular to the gate lines 4a-4e may be carried out by storing into a buffer the charge signals which are multiple line data arranged in the direction of signal lines 6a-6e.

Figure 2:
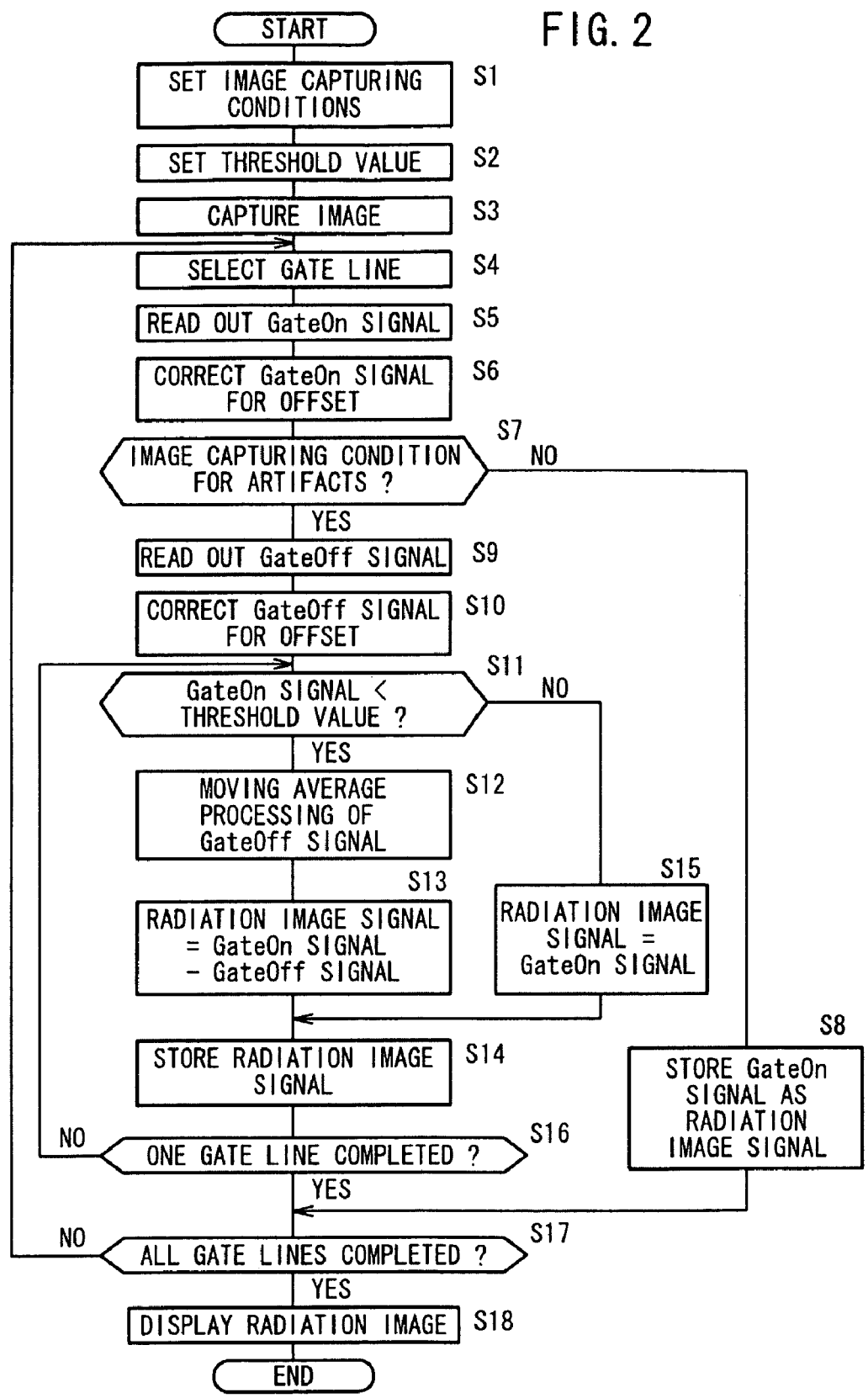
FIG. 2 is a flowchart of a process performed by the radiation image processing apparatus according to the embodiment of the invention.

Referring back to Step S11 of FIG. 2, if comparison of the GateOn signal corrected using the offset signal with the threshold value results in GateOn signal 2 threshold value, the GateOn signal is employed as the radiation image signal, since subtraction of GateOff signal from the GateOn signal causes excessive leak correction (Step S15). The radiation image signal is then stored into the radiation image signal memory 124 (Step S14).

Figure 4:
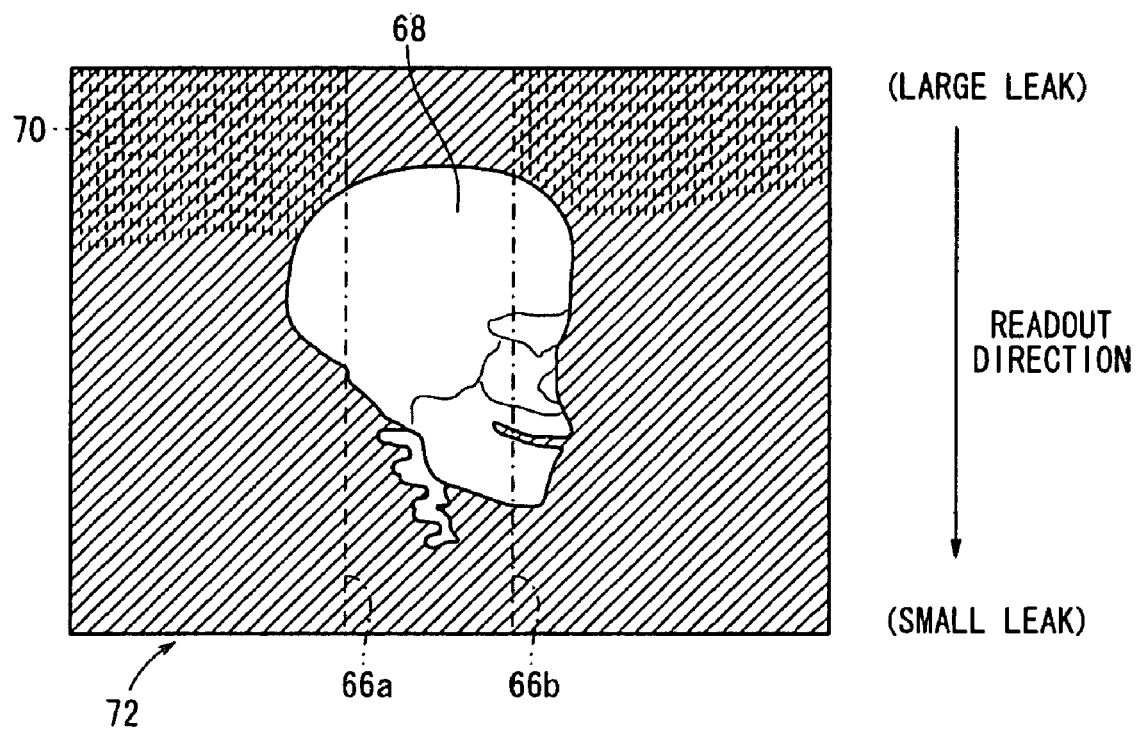
FIG. 4 illustrates a radiation image generated with the leak correction processing of FIG. 3.

Referring again to FIG. 3, GateOn signal A' represents the signal obtained from the signal line 6a-6e corresponding to the area not occupied by the subject 102, which will be referred to hereinafter as an unblocked area. The amount of charge stored in the detecting elements 11-55 located in the unblocked area reaches the pixel saturation value. Hence the signal B' obtained by subtracting the GateOff signal C, which is the leak charge signal, from the GateOn signal A' is equivalent to a signal obtained by subtracting the GateOff signal C from the pixel saturation value (see signal B' of FIG. 3 for (GateOn signal−GateOff signal) without threshold value processing). Thus, the GateOn signal A' is excessively corrected for the leak charge, and linear artifacts 70 are generated extending into the unblocked area from the readout starting side of the radiation image as shown in FIG. 4. Note that the linear artifacts 70 gradually disappear toward the readout ending side of the radiation image since the GateOff signal subtracted from the pixel saturation value decreases toward the readout ending side. In this case, no artifacts 70 occur on the subject image 68. Thus, even if the radiation image signal is obtained by subtracting the GateOff signal C from the GateOn signal A', a radiation image 72 including a subject image 68 not affected by artifacts can be obtained.

Figure 5:
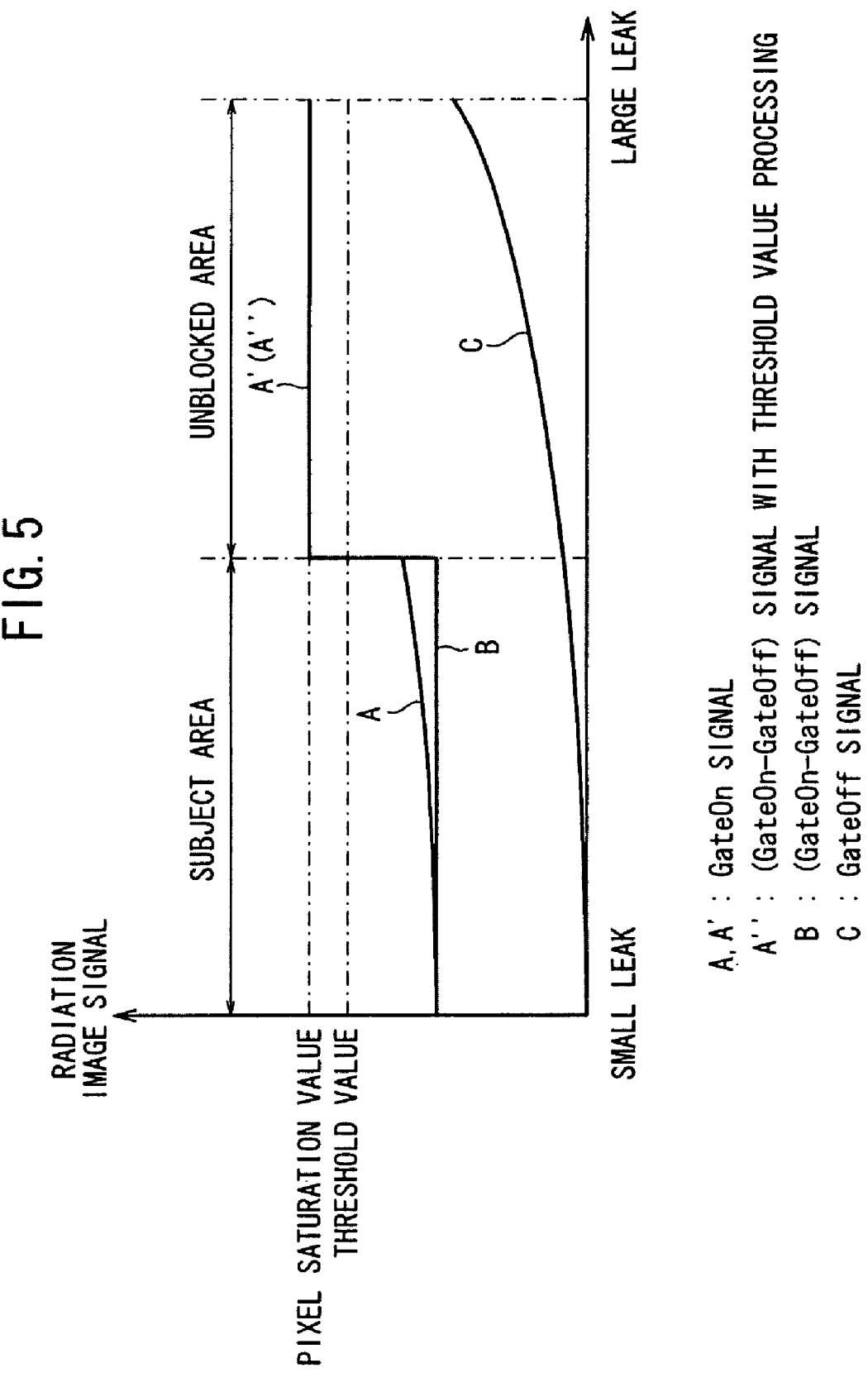
FIG. 5 illustrates radiation image signals generated with leak correction processing including threshold processing.

As described above, in the case that GateOn signal 2 threshold value, the GateOn signal corrected for the offset is equivalent to the pixel saturation value and stored into the radiation image signal memory 124 as the radiation image signal (see signal A" of FIG. 5 for (GateOn signal−GateOff signal) with threshold value processing).

Figure 6:
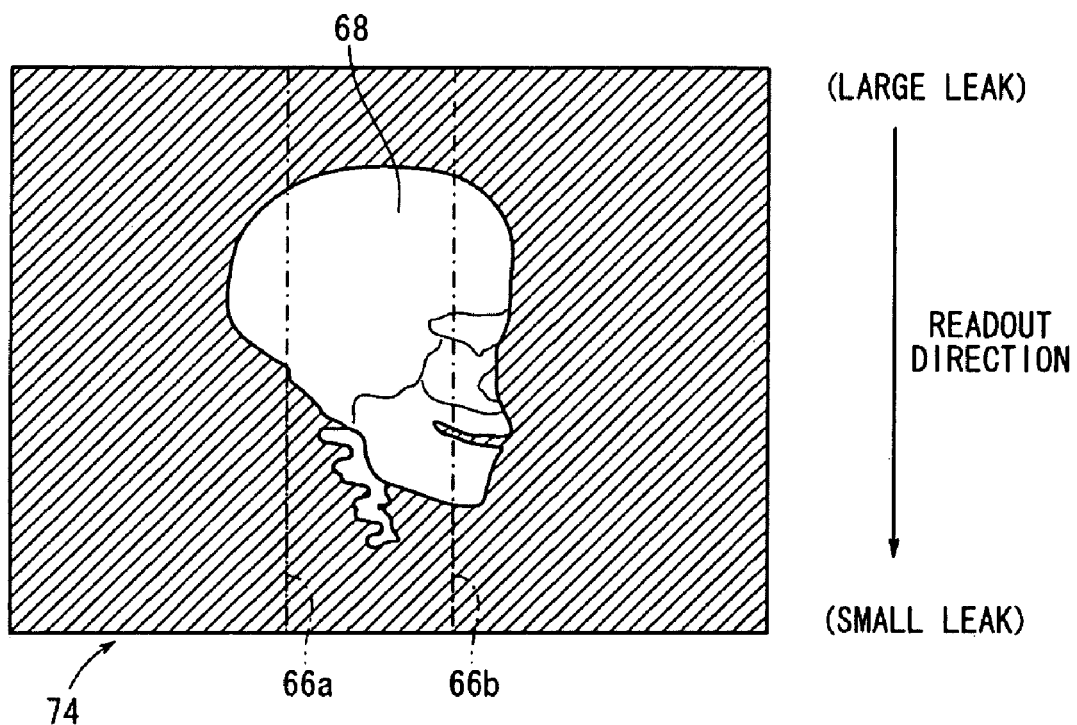
FIG. 6 illustrates a radiation image generated with the leak correction processing of FIG. 5.

Steps S11 to S15 are carried out for each detecting element 11-15 of the selected gate line 4a (step S16), and then also for the detecting elements 21-55 of the remaining gate lines 4b-4e (step S17). Thereafter, the radiation image signal corrected for the leak charge is retrieved from the radiation image signal memory 124, and the radiation image 74 is displayed on the display unit 128 by the display control circuit 126 (step S18). In the present embodiment, a suitable radiation image 74 without any artifacts 70 in the unblocked area, such as the image shown in FIG. 4, can be provided (see FIG. 6).

It should be understood that the invention is not limited to the embodiment described above. Various modifications and variations may be made without departing from the scope of the invention as defined by the appended claims.

What is claimed is:

1. An apparatus for processing a radiation image, comprising:
   a radiation detector including a plurality of detecting elements for detecting applied radiation as charge information and storing the charge information into a storage capacitor;
   a driving circuit which controls a switch included in each of the detecting elements to be in an ON state and allows the charge information stored in the storage capacitor to be read out, or to be in an OFF state to prevent the charge information stored in the storage capacitor from being read out;
   a reading circuit for reading the charge information from the storage capacitor, while the driving circuit controls the switch to remain in the ON state; and a correcting circuit for correcting the charge information by subtracting leak charge information from ON control charge information of each of the detecting elements read out by the reading circuit, wherein the leak charge information is charge information of each of the detecting elements at a time the ON control charge information is read out, the leak charge information being obtained by using OFF control charge information of each of the detecting elements that is read out by the reading circuit and that processed with a smoothing operation among detecting elements, while the driving circuit controls all of the switches to remain in the OFF state.

2. The apparatus according to claim 1, wherein the correcting circuit corrects the ON control charge information by subtracting the OFF control charge information from the ON control charge information when the ON control charge information is less than a threshold value that is set to be not more than an upper limit for charge information stored into the storage capacitor, and does not correct the ON control charge information when the ON control charge information is greater than or equal to the threshold value.

3. The apparatus according to claim 1, further comprising an image capturing condition setting unit for setting an image capturing condition for the radiation detector, wherein the correcting circuit determines whether or not to correct the ON control charge information in accordance with the image capturing condition.

4. The apparatus according to claim 3, wherein the image capturing condition comprises the radiation dose to be applied to the radiation detector, and the correcting circuit corrects the ON control charge information when the radiation dose is not less than a predetermined value.

5. The apparatus according to claim 3, wherein the image capturing condition comprises the period between applying radiation to the radiation detector and reading the charge information by the reading circuit, and the correcting circuit corrects the ON control charge information when the period is not more than a predetermined time.

6. The apparatus according to claim 1, wherein the correcting circuit corrects the ON control charge information, using an offset signal obtained from the detecting element in the ON-state, and corrects the OFF control charge information using an offset signal obtained from the detecting element in the OFF-state.

7. A method for processing radiation image, comprising the steps of:

detecting radiation that has passed through a subject by a plurality of detecting element as charge information and storing the charge information into a storage capacitor;

controlling a switch included in each of the detecting elements to be in an ON state to allow the charge information stored in the storage capacitor be read out and reading out ON control charge information from each of the detecting elements;

controlling all of the switches included in the detecting elements to be in an OFF state to prevent the charge information stored in the storage capacitor from being read out, and reading out OFF control charge information from each of the detecting elements;

obtaining leak charge information by processing the read OFF control charge information with a smoothing operation among detecting elements and correcting the charge information by subtracting, from the ON control charge information read out from each of the detecting elements by the reading circuit, the leak charge information at a time of reading out the ON control charge information.

8. The method according to claim 7, wherein the correcting of the ON control charge information is performed when the ON control charge information is less than a threshold value that is set to be not more than an upper limit for charge information stored into the storage capacitor.

9. The method according to claim 7, further comprising the step of determining whether or not to correct the ON control charge information in accordance with a condition for capturing radiation image information of the subject.

* * * * *